United States Patent [19]
Davis

[11] Patent Number: 5,675,626
[45] Date of Patent: Oct. 7, 1997

[54] CELLULAR AND BATTERY BACKUP TELECOMMUNICATION SYSTEM

[76] Inventor: Ronnie D. Davis, 561 Ivey Way, Mableton, Ga. 30059

[21] Appl. No.: 549,868

[22] Filed: Oct. 30, 1995

[51] Int. Cl.⁶ .................................................. H04M 11/04
[52] U.S. Cl. .................. 379/40; 379/44; 379/42; 379/47; 379/100
[58] Field of Search .................. 379/40, 41, 42, 379/43, 44, 47–51, 58, 59, 100; 348/13, 14, 17

[56] References Cited

U.S. PATENT DOCUMENTS

| | | | |
|---|---|---|---|
| 5,185,779 | 2/1993 | Dop et al. | 379/40 |
| 5,510,907 | 4/1996 | Koichi | 379/40 |
| 5,568,535 | 10/1996 | Sheffer et al. | 379/44 |

*Primary Examiner*—Curtis Kuntz
*Assistant Examiner*—Xu Mei

[57] ABSTRACT

A cellular and battery backup telecommunication system including an output jack connected to a conventional telephone line for hard wire communication of conventional telecommunication signals therebetween when the telephone line is in a proper operable state. Also included is an input jack connected to at least one telecommunication mechanism such an alarm system. A cellular transceiver is adapted to modulate conventional telecommunication signals into cellular signals upon the receipt thereof and further to the transmit the cellular signals via free space thereafter. Control circuitry is connected to the transceiver and further between the input jack and output jack. The control circuitry is adapted to communicate conventional telecommunication signals between the input jack and output jack when the telephone line is in an operable state and manually or automatically transmit conventional telecommunication signals from the input jack to the cellular upon the disconnection of the employed telephone line. Finally, the present invention employs an audio alarm for alerting a user of cellular transmission via a quiet audible alarm.

1 Claim, 3 Drawing Sheets

CELLULAR AND BATTERY BACKUP TELECOMMUNICATION SYSTEM

BACKGROUND OF THE INVENTION

1. Field of the Invention

The present invention relates to a cellular and battery backup telecommunication system and more particularly pertains to manually or automatically transmitting conventional telecommunication signals from a network of devices via cellular signals in free space upon the disconnection of an employed telephone line.

2. Description of the Prior Art

The use of backup alarm systems is known in the prior art. More specifically, backup alarm systems heretofore devised and utilized for the purpose of providing an alarm with an alternative power source and telephone connection are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,887,290 to Dop et al. a cellular backup system for standard security alarm networks, so that the inoperativeness of the telephone land line, automatic switch over to the cellular system is achieved. U.S. Pat. No. 5,185,779 to Dop et al. discloses an improvement on his first cellular alarm backup system. U.S. Pat. No. 4,868,859 to Sheffer discloses an interactive alarm reporting system which includes a local terminal comprised of a supervised derived channel communicator and a one-way radio communicator operating over the cellular telephone network. U.S. Pat. No. 5,146,486 to Lebowitz; U.S. Pat. No. 4,465,904 to Gottsegen et al.; and U.S. Pat. No. 5,327,478 to Lebowitz are provided as being of general interest.

In this respect, the cellular and battery backup telecommunication system according to the present invention substantially departs from the conventional concepts and designs of the prior art, and in so doing provides an apparatus primarily developed for the purpose of manually or automatically transmitting conventional telecommunication signals from a network of devices via cellular signals in free space upon the disconnection of an employed telephone line and further alerting a user of such transmission through a quiet audible alarm.

Therefore, it can be appreciated that there exists a continuing need for a new and improved cellular and battery backup telecommunication system which can be used for manually or automatically transmitting conventional telecommunication signals from a network of devices via cellular signals in free space upon the disconnection of an employed telephone line. In this regard, the present invention substantially fulfills this need.

SUMMARY OF THE INVENTION

In view of the foregoing disadvantages inherent in the known types of backup alarm systems now present in the prior art, the present invention provides an improved cellular and battery backup telecommunication system. As such, the general purpose of the present invention, which will be described subsequently in greater detail, is to provide a new and improved cellular and battery backup telecommunication system apparatus and method which has all the advantages of the prior art and none of the disadvantages.

To attain this, the present invention essentially comprises a housing with a front face, rear face, and periphery coupled therebetween defining an interior space. The housing has a cellular antenna coupled thereto which extends upwardly therefrom. An input jack and output jack are also situated on the housing. The output jack is connected to a telephone line for valid hard wire communication of conventional telecommunication signals therebetween when the telephone line is in a proper operable state. An alarm system is connected to the input jack and is adapted to activate upon the entry of an unauthorized person into a household. Upon the activation thereof, the alarm system deploys an audio alarm thus providing an immediate warning to inhabitants. The alarm system also dials a plurality of receiving mechanisms and transmits a verbal notification of an unauthorized entry thereto. Finally, the alarm system is adapted to dial a fax machine and transmit a facsimile notification of an unauthorized entry thereto. A plurality of telecommunication devices are also included. Such telecommunication devices consists of a computer modem, plurality of telephones, and facsimile. The telecommunication devices are connected to the input jack and are adapted to communicate conventional telecommunication signals therebetween. Also included is a triple throw triple pole control switch positioned on a front face of the housing. The control switch has an activated orientation, deactivated orientation, and automatic orientation. A cellular transceiver is situated within the housing and is further connected to the antenna. The cellular transceiver modulates conventional telecommunication signals into cellular signals upon the receipt thereof. After modulating the conventional signals, the cellular transceiver transmits the cellular signals via free space. For governing the operation of the present invention, control circuitry is included and is situated within the housing. The control circuitry is connected to a direct current supply, conventional alternating current receptacle, the input jack, output jack, and cellular transceiver. The control circuitry is adapted to receive power from the alternating current receptacle upon the presence thereof. If power from the alternating current supply is lost, the control circuitry automatically receives power from the direct current supply. The control circuitry has a first orientation activated upon the positioning of the control switch in the deactivated orientation or the positioning of the control switch in the automatic orientation with the conventional telephone line in the proper operable state. In the first orientation, the control circuitry allows the transmission of conventional telecommunication signals between the input jack and output jack. The control circuitry also has a second orientation activated upon the positioning of the control switch in the activated orientation or the positioning of the control switch in the automatic orientation with the conventional telephone line not in the proper operable state. In the second orientation, the control circuitry allows the transmission of conventional telecommunication signals between the input jack and the cellular transceiver. Finally, an audio alarm is situated within the housing for transmitting a quiet audible alarm therefrom when the control circuitry is in the second orientation to indicate to a user the status thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cellular and battery backup telecommunication system which has all the advantages of the prior art backup alarm systems and none of the disadvantages.

It is another object of the present invention to provide a new and improved cellular and battery backup telecommunication system which may be easily and efficiently manufactured and marketed.

It is a further object of the present invention to provide a new and improved cellular and battery backup telecommunication system which is of a durable and reliable construction.

An even further object of the present invention is to provide a new and improved cellular and battery backup telecommunication system which is susceptible of a low cost of manufacture with regard to both materials and labor, and which accordingly is then susceptible of low prices of sale to the consuming public, thereby making such cellular and battery backup telecommunication system economically available to the buying public.

Still yet another object of the present invention is to provide a new and improved cellular and battery backup telecommunication system which provides in the apparatuses and methods of the prior art some of the advantages thereof, while simultaneously overcoming some of the disadvantages normally associated therewith.

Still another object of the present invention is to manually or automatically transmit conventional telecommunication signals from a network of devices via cellular signals in free space upon the disconnection of an employed telephone line and further alerting a user of such transmission through a quiet audible alarm.

Lastly, it is an object of the present invention to provide a new and improved cellular and battery backup telecommunication system including an output jack connected to a conventional telephone line for hard wire communication of conventional telecommunication signals therebetween when the telephone line is in a proper operable state. Also included is an input jack connected to at least one telecommunication mechanism such an alarm system. A cellular transceiver is adapted to modulate conventional telecommunication signals into cellular signals upon the receipt thereof and further to the transmit the cellular signals via free space thereafter. Control circuitry is connected to the transceiver and further between the input jack and output jack. The control circuitry is adapted to communicate conventional telecommunication signals between the input jack and output jack when the telephone line is in an operable state and manually or automatically transmit conventional telecommunication signals from the input jack to the cellular upon the disconnection of the employed telephone line. Finally, the present invention employs an audio alarm for alerting a user of cellular transmission via a quiet audible alarm.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
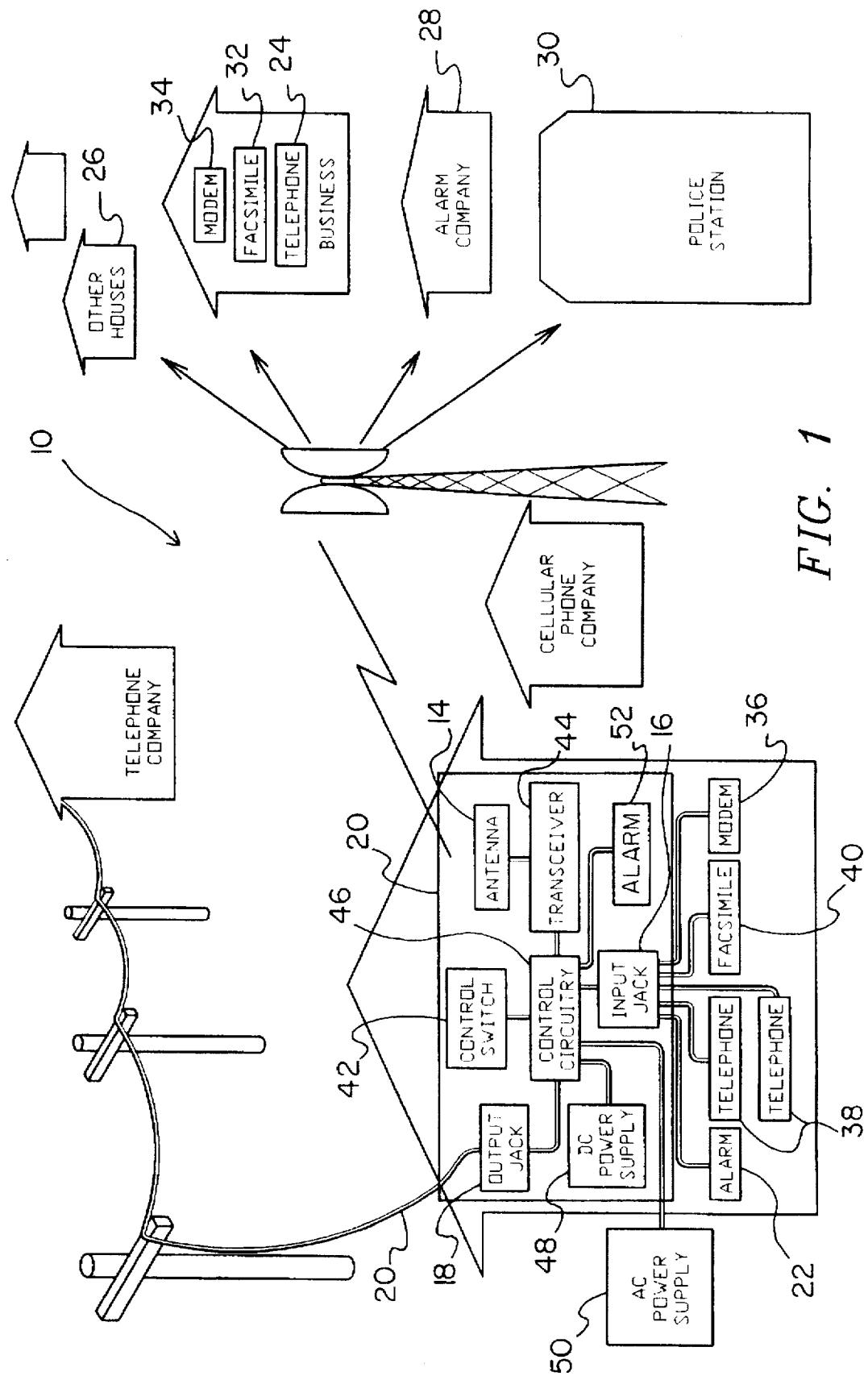
FIG. 1 is a perspective illustration of the preferred embodiment of the cellular and battery backup telecommunication system constructed in accordance with the principles of the present invention.
Figure 2:
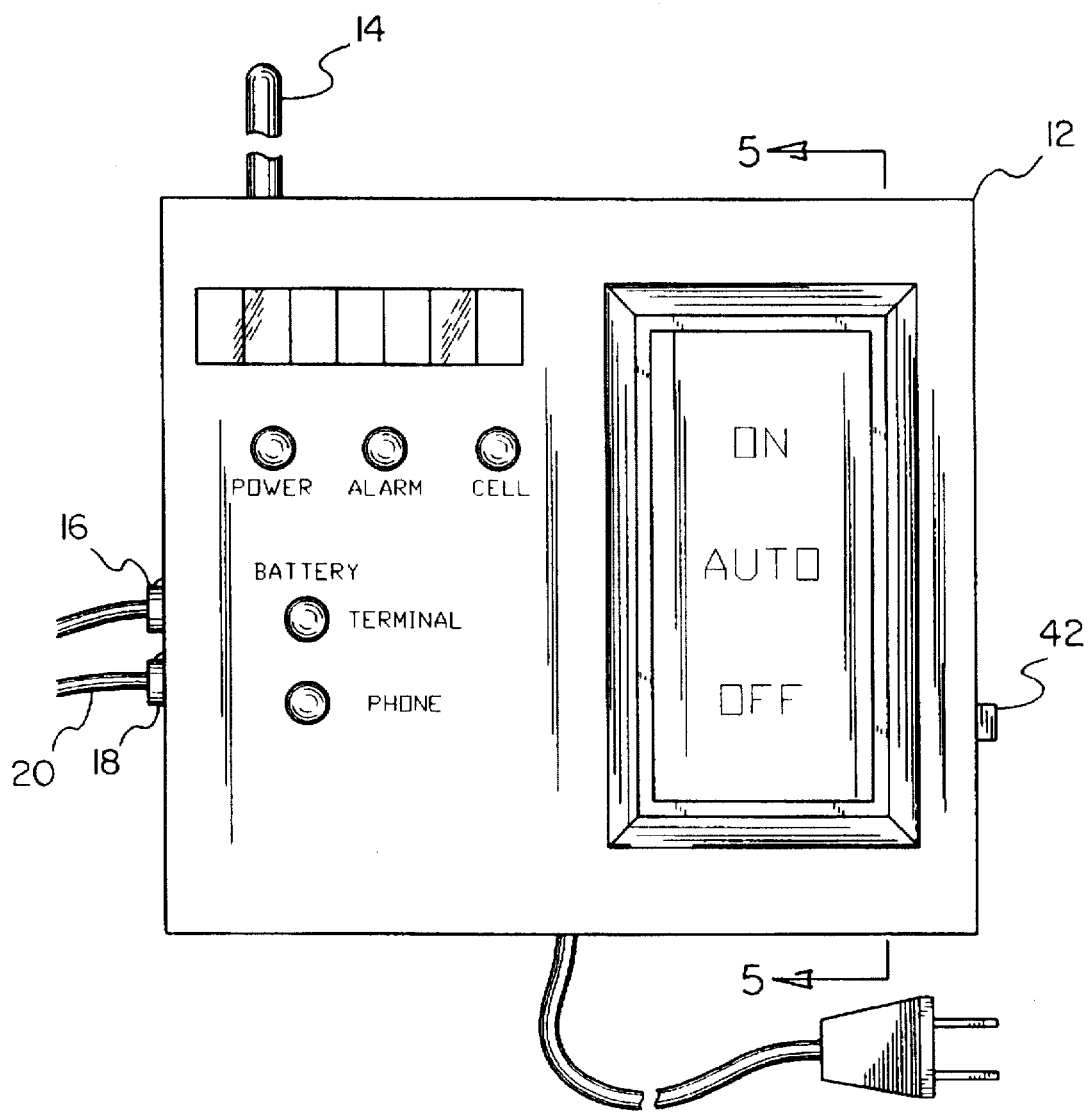
FIG. 2 is a plan front view of the present invention.
Figure 3:
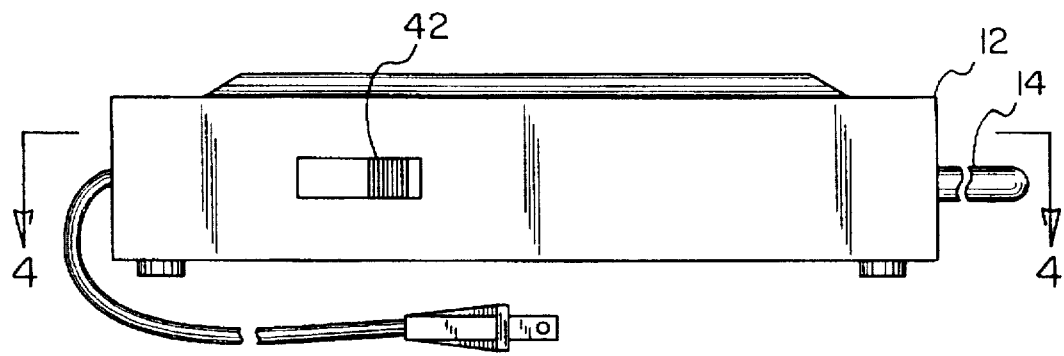
FIG. 3 is a plan side view of the present invention.
Figure 4:
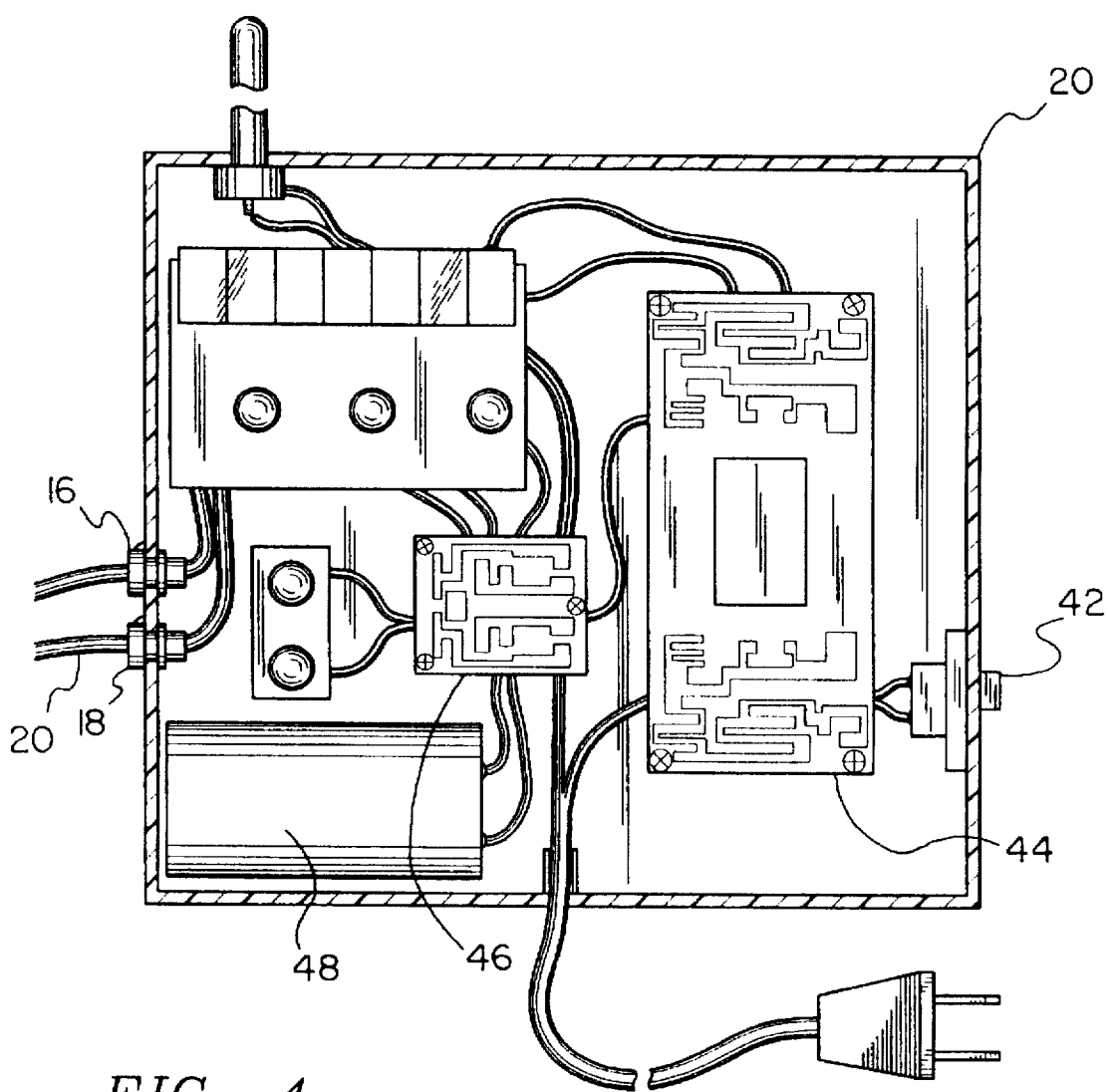
FIG. 4 is a cross-sectional top view taken along the Line 4—4 depicted in FIG. 2.
Figure 5:
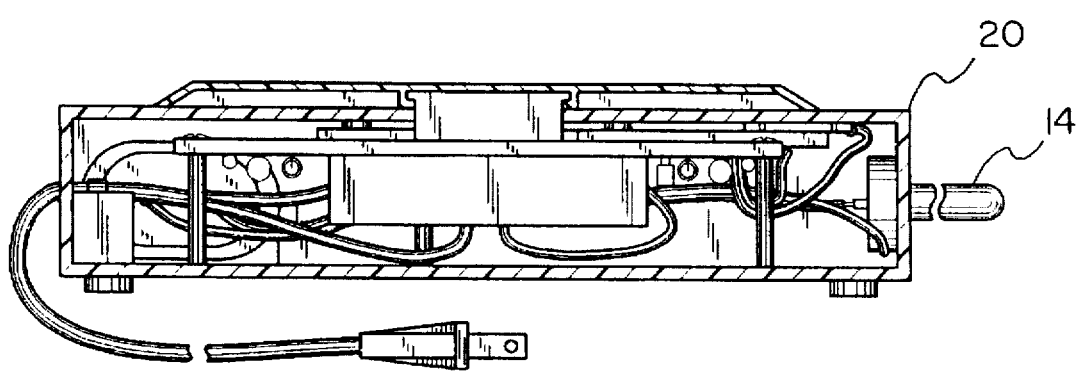
FIG. 5 is a cross-sectional side view taken along the Line 5—5 depicted in FIG. 3.

With reference now to the drawings, and in particular to FIG. 1 thereof, a new and improved cellular and battery backup telecommunication system embodying the principles and concepts of the present invention and generally designated by the reference numeral 10 will be described.

The present invention, the new and improved cellular and battery backup telecommunication system, is comprised of a plurality of components. Such components in their broadest context include a housing, alarm system, plurality of telecommunication devices, manually operated control switch, cellular transceiver, control circuitry, and audile alarm. Such components are individually configured and correlated with respect to each other so as to attain the desired objective.

More specifically, it will be noted that the system 10 of the present invention includes a housing 12 with a front face, rear face, and periphery coupled therebetween defining an interior space. The housing has a cellular antenna 14 coupled thereto which extends upwardly therefrom. An input jack 16 and output jack 18 are also situated on the housing. The output jack 18 is connected to a telephone line 20 for valid hard wire communication of conventional telecommunication signals therebetween when in a proper operable state.

An alarm system 22 is connected to the input jack 16 and is adapted to detect unauthorized entry into a household using conventional methods and further adapted to subsequently activate thereupon. With the activation thereof, the alarm system deploys an audio alarm thus providing warning to inhabitants. The alarm system also dials a plurality of receiving mechanisms and transmits a verbal notification of an unauthorized entry thereto. Such receiving mechanisms include a business phone 24, other houses 26, alarm company 28, and police station 30. The alarm system may also dial a fax machine 32 and transmit a facsimile notification of an unauthorized entry thereto. Finally, the alarm system may dial a business computer 34 and transmit a computer signal containing a notification of an unauthorized entry thereto.

A plurality of telecommunication devices with the household are also included. Such telecommunication devices consists of a computer modem 36, plurality of telephones 38, and facsimile 40. The telecommunication devices are connected to the input jack and are adapted to communicate conventional telecommunication signals therebetween.

Also included is a triple throw triple pole control switch 42 positioned on a front face of the housing. The control switch has an activated orientation, deactivated orientation, and automatic orientation.

A cellular transceiver 44 is situated within the housing and is further connected to the antenna. The cellular transceiver modulates conventional telecommunication signals into cellular signals upon the receipt thereof. After modulating the conventional signals, the cellular transceiver transmits the cellular signals via free space for receipt by a cellular transceiver station. Such a station may comprise of either a conventional land-based station or, more preferably, a satellite station. The cellular transceiver employs technology that is commonly known and commercially available.

For governing the operation of the present invention, control circuitry 46 is included and is situated within the housing. The control circuitry is connected to a direct current supply 48, conventional alternating current receptacle 50, the input jack, output jack, and cellular transceiver. The control circuitry is adapted to receive power from the alternating current receptacle upon the presence thereof. If power from the alternating current supply is lost, the control circuitry automatically receives power from the direct current supply. The control circuitry has a first orientation activated upon the positioning of the control switch in the deactivated orientation or the positioning of the control switch in the automatic orientation with the conventional telephone line in the proper operable state. In the first orientation, the control circuitry allows the transmission of conventional telecommunication signals between the input jack and output jack. The control circuitry also has a second orientation activated upon the positioning of the control switch in the activated orientation or the positioning of the control switch in the automatic orientation with the conventional telephone line not in the proper operable state. In the second orientation, the control circuitry allows the transmission of conventional telecommunication signals between the input jack and the cellular transceiver. The control circuitry employs technology that is commonly known and comercially available.

Finally, an audio alarm 52 is situated within the housing for transmitting a quiet audible alarm therefrom when the control circuitry is in the second orientation to indicate to a user the status thereof.

The cellular and battery backup telecommunication system affords multi-function operability through the use of the triple throw control switch. A user is alerted of the status of the present invention with a unobtrusive, semi-audible alarm. The present invention may be employed in a private household or a business to ensure operability of all telecommunication systems especially including an alarm system utilized therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cellular and battery backup telecommunication system comprising, in combination:

a housing with a front face, a rear face, and a periphery coupled therebetween defining an interior space, the housing having a cellular antenna coupled thereto and extending upwardly therefrom, an input jack, and an output jack connected to a conventional telephone line for valid hard wire communication of conventional telecommunication signals therebetween when the telephone line is in a proper operable state;

an alarm system connected to the input jack and adapted to activate upon the entry of an unauthorized person into a household, the alarm system further adapted to deploy an audio alarm, to dial a plurality of receiving mechanisms and transmit a verbal notification of an unauthorized entry thereto, to dial a business computer and transmit a computer signal containing a notification of an unauthorized entry, and to dial a fax machine and transmit a facsimile notification of an unauthorized entry thereto upon the activation thereof;

a plurality of telecommunication devices including a computer modem coupled to the input jack and adapted to communicate conventional telecommunication signals therebetween, a plurality of telephones connected to the input jack and adapted to communicate conventional telecommunication signals therebetween, and a facsimile connected to the input jack and adapted to communicate conventional telecommunication signals therebetween;

a manually operated triple throw triple pole control switch positioned on a front face of the housing, the control switch having an activated orientation, a deactivated orientation, and an automatic orientation;

a cellular transceiver situated within the housing and connected to the antenna, the cellular transceiver adapted to modulate conventional telecommunication signals into cellular signals upon the receipt thereof and further to the transmit the cellular signals via free space thereafter by means of a satellite;

control circuitry situated within the housing and connected between the input jack and output jack and further connected to a direct current supply, a conventional alternating current receptacle, and the cellular transceiver, the control circuitry adapted to receive power from the alternating current receptacle upon the presence thereof and further adapted to automatically receive power from the direct current supply upon the absence of the alternating power supply, the control circuitry having a first orientation activated upon the positioning of the control switch in the deactivated orientation or the positioning of the control switch in the automatic orientation with the conventional telephone line in the proper operable state for allowing the transmission of conventional telecommunication signals between the input jack and output jack and the control circuitry further having a second orientation activated upon the positioning of the control switch in the activated orientation or the positioning of the control switch in the automatic orientation with the conventional telephone line not in the proper operable state for allowing the transmission of conventional telecommunication signals between the input jack and the cellular transceiver; and an audio alarm situated within the housing for transmitting a quiet audible alarm therefrom when the control circuitry is in the second orientation.

\* \* \* \* \*